(12) United States Patent
Pollack et al.

(10) Patent No.: US 7,517,173 B2
(45) Date of Patent: Apr. 14, 2009

(54) BEARING ELEMENT

(75) Inventors: Jack Pollack, Houston, TX (US); Nabil Demian, Houston, TX (US)

(73) Assignee: Single Bouy Moorings, Inc., Marly (CH)

( * ) Notice: Subject to any disclaimer, the term of this patent is extended or adjusted under 35 U.S.C. 154(b) by 447 days.

(21) Appl. No.: 10/586,067

(22) PCT Filed: Jan. 14, 2005

(86) PCT No.: PCT/EP2005/000551

§ 371 (c)(1),
(2), (4) Date: Jul. 14, 2006

(87) PCT Pub. No.: WO2005/068856

PCT Pub. Date: Jul. 28, 2005

(65) Prior Publication Data

US 2007/0177947 A1  Aug. 2, 2007

(30) Foreign Application Priority Data

Jan. 14, 2004  (EP) .................................. 04075227

(51) Int. Cl.
*F16C 11/04* (2006.01)
(52) U.S. Cl. ..................... 405/224.2; 464/132; 384/221
(58) Field of Classification Search .............. 405/224.2; 464/132, 136; 384/220, 221, 222
See application file for complete search history.

(56) References Cited

U.S. PATENT DOCUMENTS 3,382,017 A * 5/1968 Cripe ......................... 384/125
3,930,691 A   1/1976 Greene
4,530,302 A   7/1985 Pedersen (Continued)

FOREIGN PATENT DOCUMENTS

EP          1308384          5/2003

(Continued)

OTHER PUBLICATIONS

International Search Report dated Mar. 5, 2005 for PCT/EP2005/000551.

*Primary Examiner*—John Kreck
(74) *Attorney, Agent, or Firm*—Abelman, Frayne & Schwab (57) ABSTRACT

The invention relates to a bearing element, a universal joint and an offshore construction, comprising such a bearing element. The bearing element comprises a rotation axis, a rotation body concentric with and rotatable around said axis, the rotation body defining a circumferential trajectory around said rotation axis, a curved slide member, supported on the rotation body and slidable along said rotation body along the circumferential trajectory, the slide member comprising an abutment surface extending substantially in a direction transverse to the rotation axis, a shear element, supported on the rotation body along a part of the circumferential trajectory, and comprising an outer layer and an inner layer movable with respect to each other around the rotation axis, the inner layer being fixedly connected to the rotation body and an abutment surface substantially extending in a transverse direction, and a housing part rotatable around said axis and fixedly connected to the slide member and to the outer layer of the shear element, wherein, upon rotation of the housing around said axis, the slide member is moved along the circumferential trajectory until the slide member abutment surface contacts the shear member abutment surface and a rotational force is transmitted from the housing, via the abutment surfaces to the inner layer.

8 Claims, 6 Drawing Sheets

U.S. PATENT DOCUMENTS

| | | | | |
|---|---|---|---|---|
| 4,575,071 A * | 3/1986 | Swengel et al. | | 472/105 |
| 6,499,418 B1 | 12/2002 | Pollack | | |
| 6,517,291 B1 | 2/2003 | Pollack | | |
| 6,926,611 B2 * | 8/2005 | Rivin | | 464/70 |

FOREIGN PATENT DOCUMENTS

| | | |
|---|---|---|
| GB | 856569 A | 12/1960 |
| GB | 1041070 A | 9/1966 |
| WO | WO03016128 | 2/2003 |

* cited by examiner

BEARING ELEMENT

Priority is claimed herein based on European Application No. EP 040 75 227.1 dated 14 Jan. 2004 under 35 U.S.C.

BACKGROUND

The invention relates to a bearing element, a universal joint and an offshore construction, comprising such a bearing element.

From U.S. Pat. No. 3,930,691 a fluid wedge slide bearing is known having a shear pad consisting of a curved metal-elastomer laminate on which a support pad is placed. On the support pad a sliding load bearing surface is supported which exerts a shear force on the laminate and causes the support pad to tilt and to form a lubricating wedge between the face of the support pad and the sliding surface. Hereby a flow of lubricant supporting the sliding load bearing surface, the lubricant being entrained by viscous drag from the load bearing surface, is maintained, and "stick-slip" phenomena are prevented. The known bearing can be a flat thrust bearing, a cylindrical bearing or a combination thereof.

SUMMARY AND OBJECTS OF THE INVENTION

It is an object of the present invention to provide a bearing comprising a rotation axis and a housing rotatable around said axis, which is able to accommodate frequent relatively small rotations with reduced fatigue and wear. It is a further object of the present invention to provide a hinge accommodating small motions without significant wear and fatigue.

Hereto, the hinge according to the present invention comprises a rotation axis, a rotation body concentric with and rotatable around said axis, the rotation body defining a circumferential trajectory around said rotation axis, a curved slide member, supported on the rotation body and slidable along said rotation body along the circumferential trajectory, the slide member comprising an abutment surface extending substantially in a direction transverse to the rotation axis, a shear element, supported on the rotation body along a part of the circumferential trajectory, and comprising an outer layer and an inner layer movable with respect to each other around the rotation axis, the inner layer being fixedly connected to the rotation body and an abutment surface substantially extending in a transverse direction, and a housing part rotatable around said axis and fixedly connected to the slide member and to the outer layer of the shear element, wherein, upon rotation of the housing around said axis, the slide member is moved along the circumferential trajectory until the slide member abutment surface contacts the shear member abutment surface and a rotational force is transmitted from the housing, via the abutment surfaces to the inner layer. contacts the shear member abutment surface and a rotational force is transmitted from the housing, via the abutment surfaces to the inner layer.

In the bearing of the present invention, the housing compresses, when a load is applied to the housing, the shear element and transfers the load to the rotation body. The rotation body may be a shaft, a bushing around a shaft, or may be of spherical or other geometry. Upon small deflections of the load bearing housing, the housing can rotate through small angles, for instance up to 15 degrees, preferably less than 10 degrees around the rotation body, while the rotation body remains stationary. Rotation of the housing causes the shear member to deform and to compensate for the angular displacement between the housing and the rotation body. When a maximum relative rotation of the housing is reached, the slide member abuts against the shear member, and pushes the shear member in a circumferential direction, thus causing the upper and lower shear member layers to be displaced conjointly. The shear member at this stage transfers the rotational torque from the housing to the rotation body, which thereby is rotated together with the housing. The bearing of the present invention in this way transmits large loads to the rotation body, while allowing small rotations of the housing around an equilibrium position, without causing the rotation loads to move. This results in reduced wear and fatigue of the housing and the rotation body. Only relatively large rotations of the housing will be transmitted to the rotation body and will be followed by the rotation body. The present bearing is of relatively simple construction, highly reliable and requires relatively little maintenance. It is hence especially suitable for offshore applications in which large weights are supported and small deflections are constantly caused by wind and/or wave movements. The bearing of the present invention may be applied in mooring structures, such as axial and-or radial bearing in turrets, soft yoke mooring system, such as described in WO03016128 and EP-1308384, pivoting drill string or riser support constructions (U.S. Pat. No. 6,499,418 and U.S. Pat. No. 6,517,291) and the like.

In one embodiment, the rotation member comprises a shaft carrying a bushing, which may be easily replaced or repaired.

In another embodiment two bearings of the present invention form a universal joint, allowing rotation around two perpendicular axes. The universal joint is in one embodiment advantageously employed to support a deck structure from pivoting supporting arms, in a Tension Leg Deck construction such as described in U.S. Pat. No. 6,499,418 and U.S. Pat. No. 6,517,291.

A number of embodiments of a bearing according to the invention will by way of a non-limiting example be explained in detail with reference to the accompanying drawings. In the drawings:

DETAILED DESCRIPTION OF THE PREFERRED EMBODIMENTS

Figure 1:
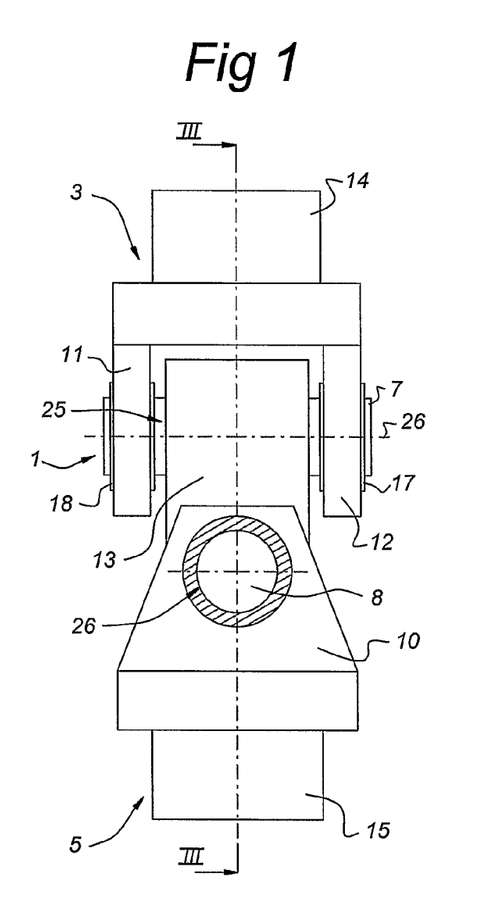
FIGS. 1-3 show a front view, a side view and a cross-sectional view along the line III-III in FIG. 1 of a universal joint comprising a bearing according to the present invention.
Figure 2:
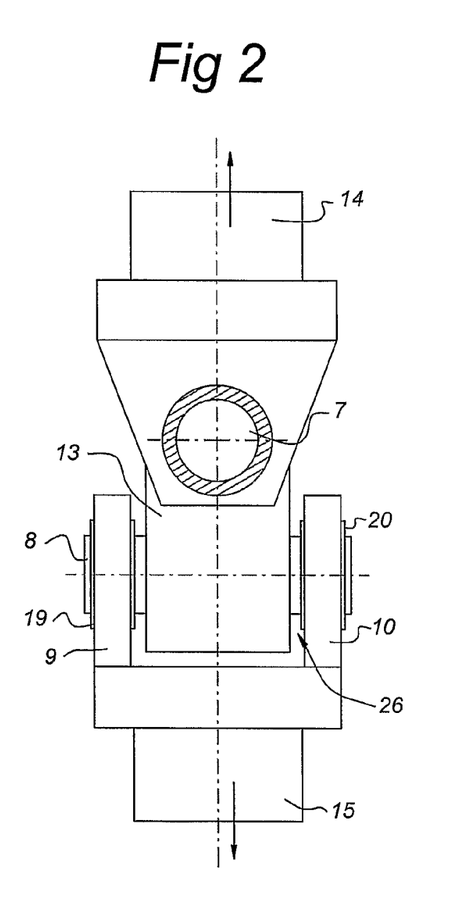
Figure 3:
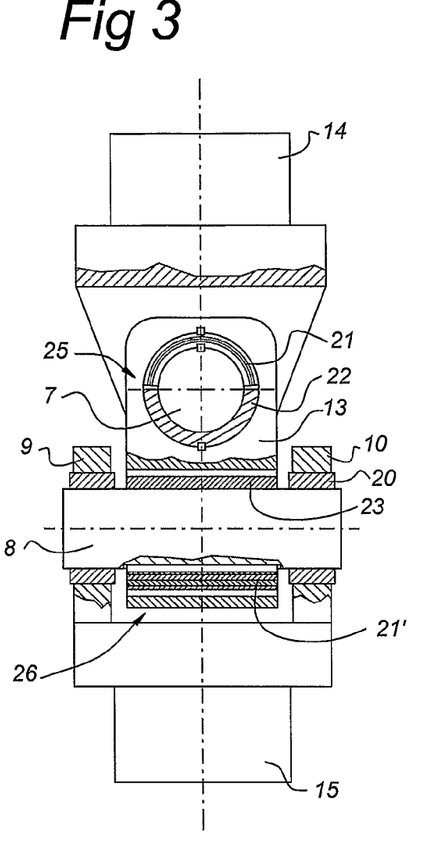

FIG. 1 shows a universal joint 1 comprising an upper part 3 and lower part 5, each part having a bearing 25, 26 according to the invention. The upper part 3 and lower part 5 each support a hinge pin 7, 8 in two ears 11, 12. The pins 7, 8 are rotatably supported in ears 9, 10 11 and 12 and are seated in bushings 17, 18 19 and 20. The pins 7 and 8 are furthermore seated in housing 13 via shear pads 21, 21' and slide members or lock-out parts 22, 23. The shear pads 21, 21' are compressed by to the loads exerted on the load bearing sections 14,15 of the universal joint 1, which loads may amount to for instance hundred tons or more. Upon hinging of the housing 13 with respect to the upper part 3 or lower part 5 through small angles, such as for instance five degrees, the shear pads 21, 21' will deform without rotation of the pins 7, 8.

Figure 4:
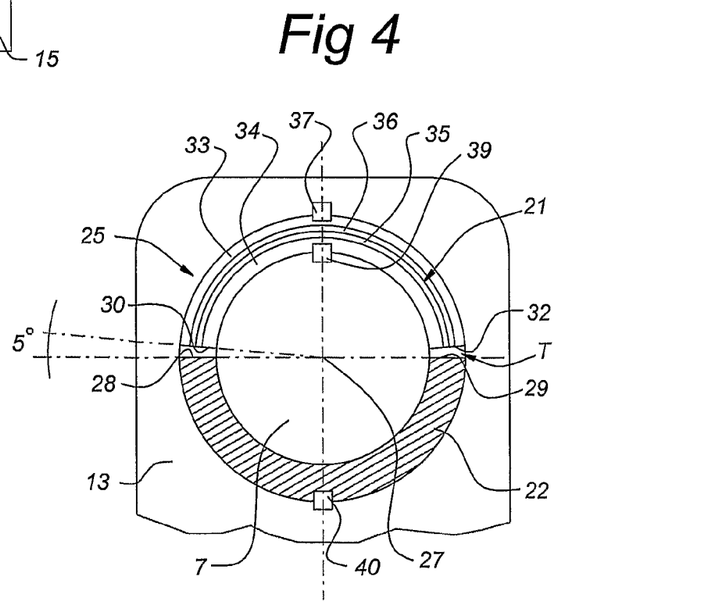
FIG. 4 shows an enlarged detail of a bearing used in the joint of FIGS. 1-3, FIGS. 5 and 6 show the bearing and universal joint, respectively of FIGS. 1-4, upon small deflections.

As shown in FIG. 4, in the bearing 25 the centreline of the pin 7 forms a rotation axis 27 extending perpendicular to the plane of the drawing. The slide member, or lock-out part 22 is rotatably supported on pin 7. The lock-out part 22 can slide along a circumferential trajectory T in which the shear pad 21 is placed. The lock-out part 22 comprises two abutment surfaces 28, 29 which can engage with abutment surfaces 30, 32 of the shear pad 21 upon rotation of the lock-out part 22. The abutment surfaces 28-32 extent in a radial direction, transversely to the centre line 27.

The shear pad 21 is comprised of an outer layer 33 which is fixed to the housing 13 via a locking pin 37.

An inner layer 34 of the shear pad 21 is fixed to the pin 7 via locking pin 39 and the lock-out part 22 is fixed to the housing 13 via locking pin 40. The inner layers 35 and 36 of the shear pad 20 are connected to the outer layers 33, 34 in such a way that they can be circumferentially displaced. The layers 33-36 of the shear pad 20 may be formed of metal and elastomeric layers of the kind described in U.S. Pat. No. 3,930,691 which in incorporated herein by reference, the layers 33 and 35 being for instance formed of metal, layers 34 and 36 being formed of vulcanised rubber.

Figure 5:
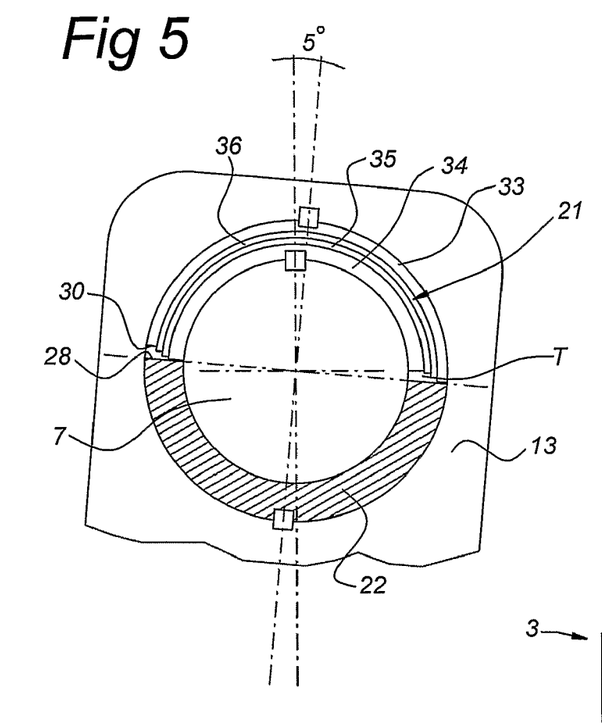
Figure 6:
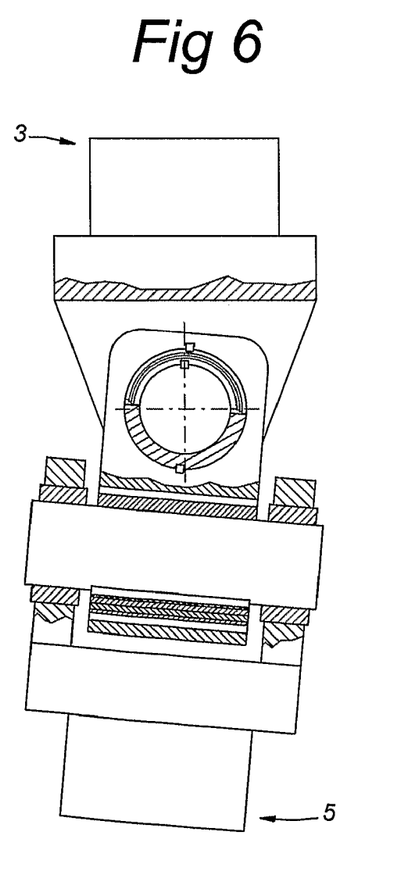

As can be seen in detail in FIG. 5 and FIG. 6, the outer layer 33 is displaced along the circumferential trajectory T upon small rotations of the housing 13, whereas the pin 7 and the inner layer 34 of the shear pad 21 do not change in angular position. The intermediate layers 35 and 36 are sheared. When the lock-out part 22, which is shown in this embodiment as a separate part, but which may form an integral part of the housing 13, abuts with its abutment surface 28 against one or more of the layers 33-34, the shear pad 21 is pushed along the circumferential trajectory T, upon further rotation of the housing 13. Hereby, the rotational force is transferred from the housing 13, via the abutment surface 30 of the shear pad 21 to the pin 7, which will then rotate in conjunction with the housing 13.

Figure 7:
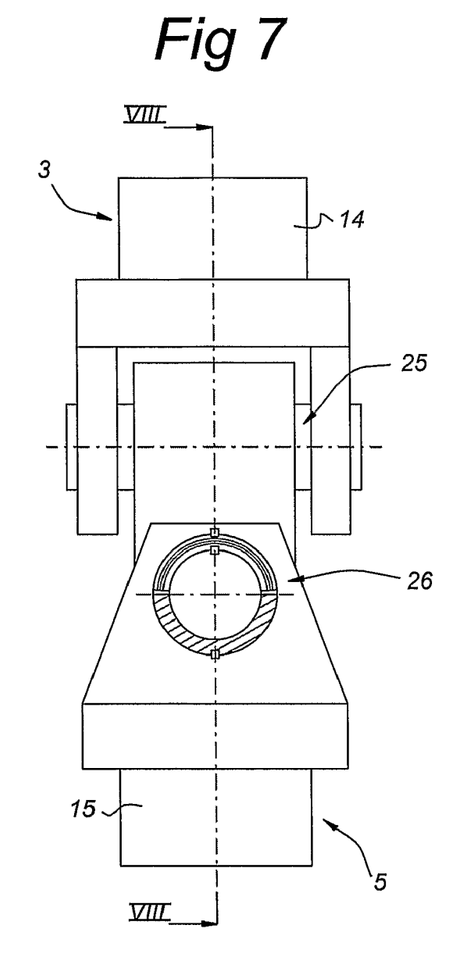
FIGS. 7 and 8 show a front view and a cross sectional view along the line VIII-VIII of FIG. 7, respectively, of a second embodiment of a universal joint including a shaft and a bushing.
Figure 8:
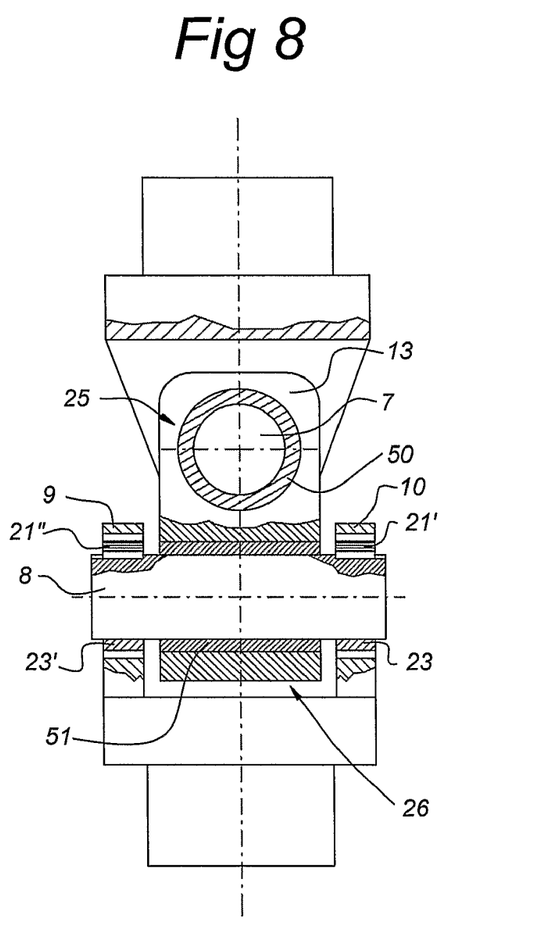

In the embodiment shown in FIG. 7 and FIG. 8, a bushing 50, 51 is placed around the pins 7, 8. The shear pads 21', 21" are relatively short compared to the length of the pins 7, 8 and are seated in the ears 9, 10. The central part of the pins 8,9 is seated in bushings 50, 51. Upon wear, the bushings 50, 51 can be replaced while maintaining the housing 13 and pins 7, 8. The bushings 50, 51 are preferably made of a low friction material, whereas the housing 13 and pins 7, 8 are preferably made of steel.

Figure 9:
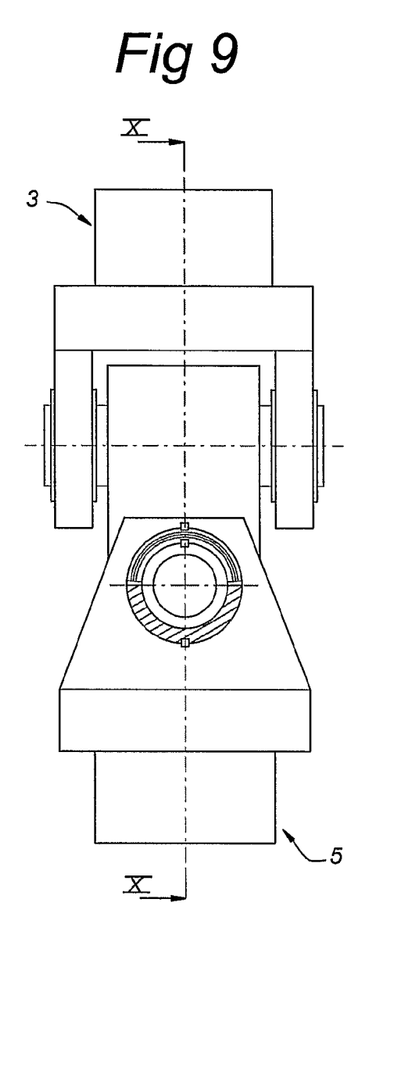
FIGS. 9 and 10 show a front view and cross sectional view along the line IX-IX of FIG. 9, respectively, of a third embodiment of a universal joint in which the shear pad is supported on a bushing.
Figure 10:
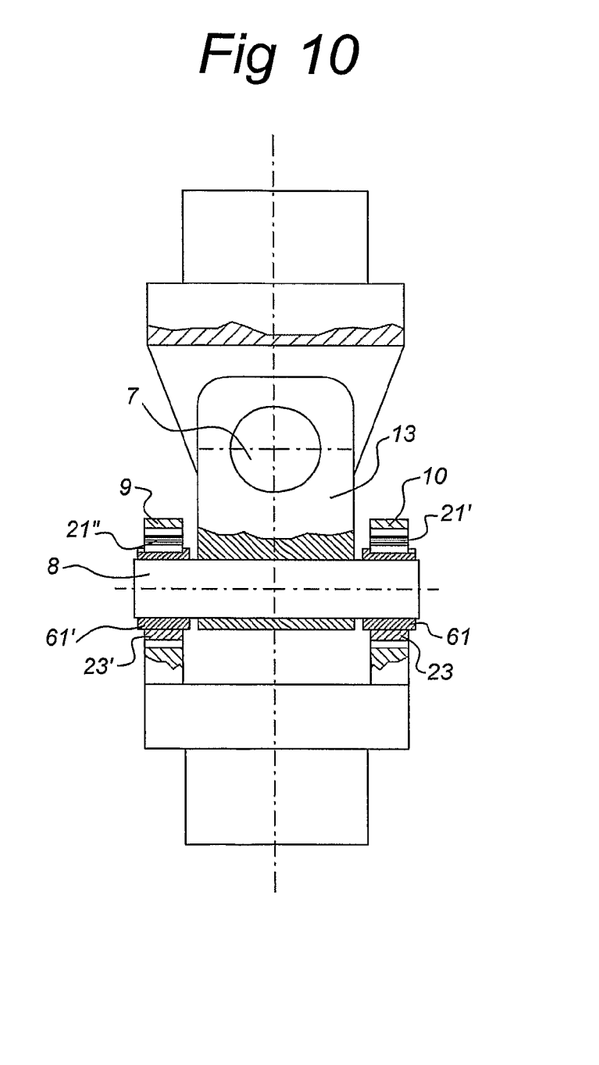

In the embodiment shown in FIG. 9 and FIG. 10, the bushings 61, 61' are relatively short and support the shear pads 21', 21" that are seated in the ears 9, 10. The pin 8 is removably fitted or clamped within the housing 13.

Figure 11:
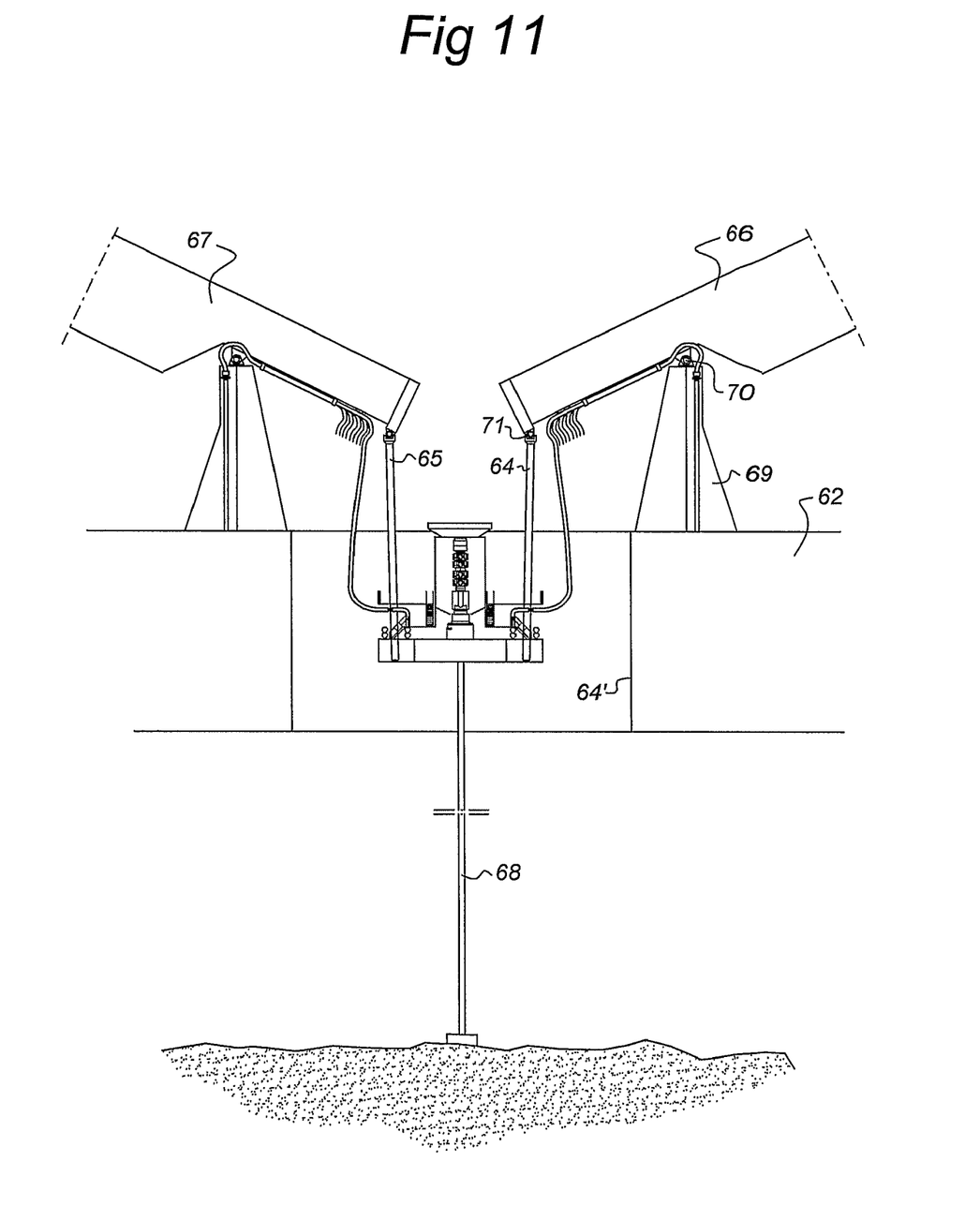
FIG. 11 shows a deck support construction on an offshore structure, comprising a universal joint according to any of FIGS. 1-10.

FIG. 11 shows an offshore construction 62, such as a drilling/workover barge, with a deck structure 63 that is supported over a well 64 in the vessel. The deck structure 63 is supported from rods 64, 65 which are connected to pivot arms 66, 67. The deck structure 63 carries for instance a blow-out preventor or one or more production trees, and may be connected to the seabed via a drill string and/or one or more risers 68. The pivot arms 66, 67 are placed on supports 69, via a bearing 70, which may comprises a bearing according to the present invention. At the end of the arm 66, a universal joint 71 as shown in any of FIGS. 1-10 is connected allowing pivoting of the arms 64, 65 around an axis parallel to the width direction of the deck structure 63 and an axis perpendicular to the plane of the drawing. The weight of the deck 63 may be several hundred tons.

The invention claimed is:

1. Bearing comprising a rotation axis, a rotation body concentric with and rotatable around said axis, the rotation body defining a circumferential trajectory around said rotation axis, a curved slide member, supported on the rotation body and slidable along said rotation body along the circumferential trajectory (T), the slide member comprising an abutment surface extending substantially in a direction transverse to the rotation axis, a shear element, supported on the rotation body along a part of the circumferential trajectory, and comprising an outer layer and an inner layer movable with respect to each other around the rotation axis, the inner layer being fixedly connected to the rotation body and an abutment surface substantially extending in a transverse direction, and a housing part rotatable around said axis and fixedly connected to the slide member and to the outer layer of the shear element, wherein, upon rotation of the housing around said axis, the slide member is moved along the rotation of the circumferential trajectory until the slide member abutment surface contacts the shear member abutment surface and a rotational force is transmitted from the housing, via the abutment surfaces to the inner layer.

2. Bearing according to claim 1, wherein the shear element (21, 21', 21"), comprises at least one metal layer and one elastomeric layer.

3. Bearing according to claim 1, wherein the housing (13) at least substantially surrounds the slide member.

4. Bearing according to claim 1, wherein the rotation body comprises a bushing supported on an axis.

5. Bearing according to claim 1, wherein the rotation member comprises a cylindrical shaft.

6. Bearing according to claim 1, wherein a load of more than 1000 kg is attached to the housing exerting a compressive force on the shear element.

7. A universal joint (1) comprising two mutually perpendicular bearings according to claim 1.

8. An offshore construction comprising a floating body, at least two support arms on the floating body, each support arm having a base part and transverse arm part pivotally connected to the base part in a first hinge joint, the transverse arms carrying a deck structure via a support member, attached to the support arm via a second hinge joint, wherein at least one of the first and second hinge joint, comprises a bearing according to claim 1.

* * * * *

UNITED STATES PATENT AND TRADEMARK OFFICE
CERTIFICATE OF CORRECTION

PATENT NO. : 7,517,173 B2
APPLICATION NO. : 10/586067
DATED : April 14, 2009
INVENTOR(S) : Jack Pollack and Nabil Demian It is certified that error appears in the above-identified patent and that said Letters Patent is hereby corrected as shown below:

Title page, item [73] Assignee's should read --Single Buoy Moorings, Inc.--

Signed and Sealed this

Thirtieth Day of June, 2009

JOHN DOLL
*Acting Director of the United States Patent and Trademark Office*